Patented Mar. 3, 1925.

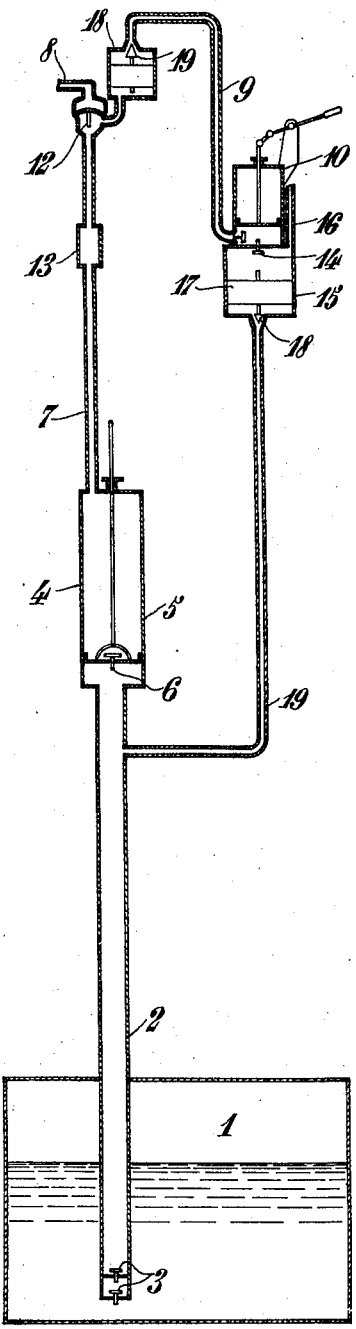

1,528,253

UNITED STATES PATENT OFFICE.

ALFRED LANSER, OF CORSEAUX, SWITZERLAND.

CONSTRUCTION OF MEASURING PUMPS.

Application filed November 5, 1923. Serial No. 673,039.

*To all whom it may concern:*

Be it known that I, ALFRED LANSER, subject of the King of Belgium, residing at Corseaux, Switzerland, have invented certain new and useful Improvements in the Construction of Measuring Pumps, of which the following is a specification.

Measuring pumps used for the distribution of liquids, such as hydrocarbons, are inconvenient, during the periods of rest, because they allow the liquid which has been raised above the piston to pass downwardly below the same. It results therefrom that the purchaser does not receive the exact volume of liquid, upon distribution, and that, if the period of stoppage is somewhat long, the pump will be drained completely, the liquid returning to the reservoir. In the latter case, the operation of the distribution or control meter is deceptive since on restarting the pump and actuating the piston, there is re-registered a quantity of liquid which should have been distributed and this fact does not appear from the registering device.

The present invention has for its object improvements in the construction of measuring pumps of the above mentioned type, for the purpose of remedying the inconveniences above indicated. In obtaining this result and in order to permit either of compensating the losses of liquid by leakage around the piston, or of re-starting the measuring pump in case the pump is drained without necessity of actuating the piston of the latter and, consequently, the distribution meter, to the said measuring pump is connected a secondary circuit in which is arranged a mechanism which places in movement the liquid in the main pipe line on which is arranged the said pump. This auxiliary mechanism consists of a hand pump the operation of which raises the liquid through the barrel of the measuring pump, the piston of the latter remaining stationary.

The accompanying diagrammatic drawing represents by way of example a form of the present invention.

1 designates the reservoir containing the liquid to be distributed. In the latter is immersed the suction tube 2, provided with a double check valve 3, which is connected with the barrel 4 of the measuring pump. The piston 5 of the latter carries a check valve 6 and its movements are registered by the control meter. From the pump 4 extends the pipe 7 which is connected to the distributing pipe line or pipe lines 8.

This known plant presents, as indicated in the foregoing, the inconvenience, when the pump remains at rest, that the quantity of liquid contained above the piston 5 and which must constitute the volume to be distributed does not remain constant. In fact, leakage takes place between the piston 5 and the pump barrel 4; this leakage can take place to such an extent that, if the period of stoppage is somewhat long, it results in the draining of the pump.

For the purpose of maintaining the constancy of the volume of liquid to be distributed and avoiding the draining of the pump without having to act on the piston 5 of the measuring pump 4, with the pipe line and with the said pump there is combined, in accordance with the present invention, an auxiliary pipe line 9 in which is arranged a suction mechanism 10. In the case shown, this mechanism consists of a hand pump.

The delivery pipe line 7 which carries a sight glass 13 is in communication with the distributing pipe line 8 and with a pipe 9 of small diameter constituting the suction pipe line of the auxiliary pump. At the entrance of this pipe line 9 is arranged a constant level reservoir 18, the float of which controls a valve 19. In addition, an automatic check valve 12 controls the distributing pipe line 8.

The auxiliary pump 10 is in relation, through the medium of a valve 14, with a reservoir 15 communicating with the atmosphere (pipe 16) and enclosing a float 17. The latter controls the displacements of a valve (needle valve 18) arranged at the orifice of a pipe 19 which is branched on the suction pipe line 2 of the measuring pump 4.

Normally, the volume of liquid which must be distributed by the measuring pump at each upward movement of its piston 5, is determined by the level coming opposite a mark on the sighting glass 13. If the operator notices that these conditions are not satisfied, he actuates the piston of the pump 10, and he can therefore raise the liquid up to its normal level. In fact, it will be seen that when the auxiliary pump 10 is operated, the valve 12 automatically fits upon its seat and cuts off all communication between the piping 7 and the distributing pipe line 8.

It will be noted that the auxiliary pump 10 sucking through a pipe line 9 of small diameter creates a very high partial vacuum in the main measuring pipe line and, consequently, overcomes the resistance which is opposed to the raising of the liquid in the latter.

When, under the action of the auxiliary pump 10, the raising of the level of the liquid has been produced in the pipe line 7, the float of the reservoir 18 is lifted, so that the valve 19 is actuated and closes the pipe line 9 thus putting out of action the auxiliary pump 10.

At this time the valve 11 can open for permitting, by means of the piston 6 of the measuring pump, the distribution of the volume of hydrocarbon which is contained in the latter.

The condensation products or the liquid which can fortuitously enter in the auxiliary pump so return through the medium of the float reservoir 15, in the suction pipe line 2 of the measuring pump, in other words in the reservoir 1.

What I claim and desire to secure by Letters Patent is:

1. In combination with a measuring pump, an auxiliary pump, a pipe line connecting the suction orifice of the auxiliary pump to the delivery orifice of the measuring pump, an exhaust pipe line branched on the preceding pipe line, means for controlling this exhaust pipe line, and means for controlling the preceding pipe line between the point of junction with the exhaust pipe line and the suction orifice of the auxiliary pump.

2. In combination with a measuring pump in communication with a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, means for controlling the preceding pipe line between the point of junction with the exhaust pipe line and the suction orifice of the auxiliary pump, means for connecting the delivery orifice of the auxiliary pump with the feed reservoir.

3. In combination with a measuring pump, the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, means for controlling the preceding pipe line between the point of junction with the exhaust pipe line and the suction orifice of the auxiliary pump, a pipe line connecting the delivery orifice of the auxiliary pump and the suction pipe of the measuring pump.

4. In combination with a measuring pump the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, means for controlling the preceding pipe line between the point of junction with the exhaust pipe line and the suction orifice of the auxiliary pump, a pipe line connecting the delivery orifice of the auxiliary pump and the suction pipe of the measuring pump, means for controlling this pipe line so that it may be closed when the auxiliary pump does not deliver any liquid.

5. In combination with a measuring pump the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, means for controlling the preceding pipe line between the point of junction with the exhaust pipe line and the suction orifice of the auxiliary pump, a pipe line connecting the delivery orifice of the auxiliary pump and the suction pipe of the measuring pump, a reservoir interposed in this pipe line, a float valve arranged in this reservoir.

6. In combination with a measuring pump the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, means for automatically closing the preceding pipe line between the point of junction with the exhaust pipe line and the suction orifice of the auxiliary pump when the liquid enters in this pipe line, a pipe line connecting the delivery orifice of the auxiliary pump and the suction pipe of the measuring pump, a reservoir interposed in this pipe line, a float valve arranged in this reservoir.

7. In combination with a measuring pump the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, means for controlling this exhaust pipe line, a reservoir arranged on the preceding pipe line between the point of junction with the exhaust pipe line and the suction orifice of the auxiliary pump, a float valve arranged in this reservoir, a pipe line connecting the delivery orifice of the auxiliary pump and the suction pipe of the measuring pump, a reservoir interposed in this pipe line, a float valve arranged in the reservoir.

8. In combination with a measuring pump the suction orifice of which is connected by a pipe to a feed reservoir, an auxiliary pump, a pipe line connecting the suction orifice of the auxiliary pump to the delivery orifice of the measuring pump, an exhaust pipe line branched on the preceding pipe line, a valve automatically closing the exhaust pipe line when the measuring pump does not operate, a reservoir arranged on the preceding pipe line between the point of junction with the exhaust pipe line and the suction orifice of the auxiliary pump, a float valve arranged in this reservoir, a pipe line connecting the delivery orifice of the auxiliary pump and the suction pipe of the measuring pump, a reservoir interposed in this pipe line, a float valve arranged in this reservoir.

In testimony whereof I have signed my name to this specification.

ALFRED LANSER.